United States Patent [19]

Smith et al.

[11] 4,085,059
[45] Apr. 18, 1978

[54] FOAM TYPE COATING REMOVER

[75] Inventors: Oliver Dale Smith, San Juan Capistrano; Gerald M. Goldberg, Chatsworth, both of Calif.

[73] Assignee: Bunker Ramo Corporation, Oak Brook, Ill.

[21] Appl. No.: 663,704

[22] Filed: Mar. 4, 1976

Related U.S. Application Data

[63] Continuation-in-part of Ser. No. 466,516, May 2, 1974, abandoned.

[51] Int. Cl.² .................. C11D 3/28; C11D 7/32
[52] U.S. Cl. ................................. 252/118; 134/38; 252/90; 252/117; 252/153; 252/171; 252/307; 252/542; 252/546; 252/548; 252/DIG. 8
[58] Field of Search .................. 252/89, 90, 117, 118, 252/119, 120, 132, 542, 546, 548, 153, 171, 307, DIG. 8, 354, 357; 134/38, 42

[56] References Cited

U.S. PATENT DOCUMENTS

| | | | |
|---|---|---|---|
| 2,393,798 | 1/1946 | Morgan et al. | 252/118 |
| 2,443,173 | 6/1948 | Baum et al. | 252/127 |
| 3,131,153 | 4/1964 | Klausner | 252/305 |
| 3,131,154 | 4/1964 | Klausner | 252/305 |
| 3,179,609 | 4/1965 | Morison | 260/28 |
| 3,355,385 | 11/1967 | Mackley | 252/104 |
| 3,669,740 | 6/1972 | Yamamoto et al. | 134/22 |
| 3,737,386 | 5/1973 | Geiss et al. | 252/162 |
| 3,764,384 | 10/1973 | Berni | 134/12 |
| 3,779,933 | 12/1973 | Eisen | 252/118 |
| 3,806,460 | 4/1974 | Mukai et al. | 252/111 |

Primary Examiner—P.E. Willis, Jr.
Attorney, Agent, or Firm—F. M. Arbuckle; W. Lohff

[57] ABSTRACT

A coating remover comprised of a substantially uniform mixture of about 5 to 35 percent by weight of N-methyl-2-pyrrolidone and the balance comprised of a water-base carrier containing about 10 to 35 percent by weight organic surfactants therein so that when such liquid mixture is admixed with a gas, a substantially non-flammable, non-toxic, biodegradable and easily dispensible foam results which is characterized by a very high persistency and a very low volatility. This foam-type coating remover is useful for removing various paints, lacquers and other coatings or finishes, such as based on polyamide epoxy, cellulosic, vinyl or acrylic resins from various surfaces.

4 Claims, No Drawings

4,085,059

FOAM TYPE COATING REMOVER

CROSS-REFERENCE TO RELATED APPLICATION

This is a continuation-in-part of our U.S. Ser. No. 466,516, filed May 2, 1974, now abandoned which is incorporated herein by reference.

BACKGROUND OF THE INVENTION

1. Field of the Invention

The invention relates to foam-type coating removers and somewhat more particularly to an improved composition and method for removing or stripping paints, varnishes, lacquers and other coatings and/or finishes from various surfaces by utilizing a foam-type coating remover which is characterized by relatively high persistency and relatively low volatility. 2. Prior Art The removal or stripping of paint, varnish, lacquer and other coatings or finishes from a surface presents a variety of problems to those in the art, particularly where relatively large surfaces are involved having horizontal and vertical portions. The removal of special coatings, such as coatings based on polyamide epoxy resins has introduced even further complications because of the special characteristics of such coatings which may require more volatile solvents as well as a relatively long exposure to the reacting solvent in order to obtain adequate removal. Known coating removers are not well suited to these difficult coating removal situations, since they have numerous disadvantages, such as being toxic, flammable and/or non-biodegradable or being too volatile or lacking sufficient persistency or being difficult to dispense and/or removed.

Although N-methyl-2-pyrrolidone is known to be effective as a stripping agent for paints, varnishes and other finishes based on cellulosic, vinyl and acrylic resins, however, to the best of our present knowledge, N-methyl-2-pyrrolidone has not heretofore been used or suggested for use as a reactive solvent in a foam-type coating remover.

N-methyl-2-pyrrolidone is also known for use as an effective stripping agent in removing chromate primers and epoxy coatings when a relatively large amount thereof (65%) is combined with methylene chloride and other usual agents. However, such a formation is expensive and the use of methylene chloride is disadvantageous in that methylene chloride is toxic and is non-biodegradable so that any formulation utilizing this material must be handled with care so as not to injure the operator or the environment.

SUMMARY OF THE INVENTION

The invention provides a liquid coating remover adapted for forming a relatively stable foam comprised of a mixture of a reactive solvent consisting essentially of N-methyl-2-pyrrolidone and a water-based carrier, a method of formulating such a coating remover and a method of using the so-produced foam-type coating remover.

An important feature and object of the invention resides in providing a foam-type coating remover which is characterized as having a relatively high persistency and a relatively low volatile loss so that after dispensing a given amount of such foam-type coating remover onto a coating-covered surface, the volume of the coating remover remaining on the surface after 24 hours at about 77° F. is equal to at least 50% of the original volume of the dispensed amount of the remover and the weight of the coating remover remaining on the surface after 24 hours at about 77° F. is equal to at least 90% of the original weight of the dispensed amount of the remover. Because of the high persistency and low volatile loss of the foam-type coating remover of the invention, it is of particular advantage not only for removal of coatings from large surfaces having horizontal and vertical portions, but also for use on surfaces located in unprotected work areas, such as exterior surfaces or the like subjected to windy conditions.

Another object of the invention is to provide a foam-type coating remover which is relatively biodegradable, relatively non-toxic and relatively non-flammable as well as being easily removed, as with water, so as to simplify cleanup.

Yet another object of the invention is to provide a relatively biodegradable, non-toxic, non-flammable foam-type coating remover of high persistency and low volatile loss which is particularly effective in removing polyamide epoxy resin-based coatings.

Another object of the invention is to provide a foam-type coating remover which can easily be dispensed onto a variety of coating-containing surfaces by a human operator without protective clothing and the like and which can be easily removed, such as with water and disposed of in the environment without danger or pollution.

Yet another object of the invention is to provide a foam-type coating remover which may include a dye therein to increase the heat absorption capability of the foam-type remover and thereby increase the efficiency of the reactive solvents in removing various coatings.

An exemplary composition adapted for forming the foam-type coating remover comprises about 5 to 35 percent by weight of N-methyl-2-pyrrolidone, about 30 to 85 percent by weight of water and about 10 to 35 percent by weight of a water-soluble organic surfactant material capable of emulsifying a gas, such as air, with water, to form a relatively stable foam. The surfactant material preferably includes a $C_6$ to $C_{18}$ fatty acid material, a $C_2$ to $C_{18}$ alkylolamine and a $C_3$ to $C_{18}$ polyhydric alcohol.

DESCRIPTION OF THE PREFERRED EMBODIMENTS

In accordance with the principles of the invention, a liquid coating-remover adapted for forming a relatively stable foam is provided.

Generally, the coating remover is comprised of a substantially homogeneous mixture of a reactive solvent, N-methyl-2-pyrrolidone and the carrier therefor, a water solution containing organic surfactants therein which emulsify a gas admixed with the water to form a foam and aid in solubilizing and removing the coating attacked by the reactive solvent. The formed foam-type coating remover of the invention is principally characterized as being safe to personnel coming in contact therewith and to the environment while having a relatively high persistency and a relatively low volatile loss.

The invention also includes a method of removing various types of coatings, such as those based on polyamide epoxy resins from variously disposed surfaces (vertical, horizontal, upside down, curved, etc.) whereby a human operator may readily dispense the foam-type coating remover provided herein onto a coating-covered surface, maintain contact between the coating and the coating remover under substantially ambient conditions for a period of time sufficient for a reaction occur (with and without mechanical agitation) between the coating and at least the reactive solvent within the coating remover and then remove the resultant reaction product by a stream of water or the like.

Generally, the coating remover of the invention consists essentially of a solution comprised of a substantially uniform mixture of about 5 to 35 percent by weight of N-methyl-2-pyrrolidone, about 30 to 85 percent by weight of water and about 10 to 35 percent by weight of a water-soluble organic surfactant material. When this liquid coating remover is properly admixed with a gas, such as air or other relatively inert gas, an aqueous suspension of relatively small bubbles of such gas separated from one another by relatively thin and tough film of such solution forms, i.e., a foam-type coating remover. This foam-type coating remover (which comprises a uniform mixture of about 65 to 95% gas and about 5 to 15% liquid) is of relatively high persistency (i.e., resists liquefication at ambient conditions over prolonged periods of time) and is of relatively low volatility (i.e., resists evaporation at ambient conditions over prolonged periods of time). In addition, this foam-type coating remover is relatively safe since it is non-toxic to human operators, substantially non-flammable and relatively biodegradable.

In order to obtain the desired properties of high persistency and low volatility in a foam-type coating remover effective for removing various coatings, such as cellulosic coatings, vinyl coatings, acrylic coatings, polyamide epoxy coatings and other like coatings, it is necessary to include a controlled amount of the reactive solvent, N-methyl-2-pyrrolidone within the coating remover composition. Relatively low amounts of the reactive solvent, which is a known material and commercially available, for example, under the registered trademark "M-PYROL" (GAF Corp.) in combination with water and the surfactant material produces a relatively stable foam which is of marginal effectiveness for quick removal of a coating. On the other hand, relatively large amounts of the reactive solvent in the coating remover composition is uneconomical and produces a relatively unstable foam which does not have the required high persistency. It has been found that in order to obtain an economical composition which provides an effective coating removing action and has a sufficiently high persistency, a concentration in the range of about 5 to 35 percent by weight and somewhat more preferably in the range of about 6 to 15 percent by weight and even more preferably in the range of about 7 to 13 of N-methyl-2-pyrrolidone is required.

In order to obtain the desired emulsification of a gas within the liquid-coating remover, it is also necessary to include a controlled amount of a surfactant material which not only emulsifies gas with water to form a water-based foam but also solubilizes and otherwise interacts with the coating being removed. Preferably, the surfactant material is a water-soluble organic material capable of concentrating at the inner face between a liquid film containing such surfactant material and a gas so as to form the desired foam-type material. The organic surfactant material should have a relatively high sudsing and foaming power and should be relatively non-toxic, non-flammable and relatively biodegradable. The organic surfactant material should also be compatible with other surfactants, such as emulsifiers, emollients, humectants, viscosity control or thickening agents, abrasives, dyes, preservatives, etc. Organic surfactants useful in the practice of the invention may be selected from the anionic, cationic, nonionic and amphoteric materials and preferably a combination of anionic and nonionic materials are utilized.

Exemplary anionic materials useful in the practice of the invention are water-soluble alkyl aryl sulfonates wherein the alkyl substituent varies from $C_6$ to $C_{18}$ and the aryl substituent may be benzyl, naphthyl or phenyl, such as dodecylbenzene sodium sulfonate; water-soluble alkyl sulfonates in which the alkyl substituent varies from $C_6$ to $C_{18}$, such as sodium lauryl or stearyl sulfonate; water-soluble aryl sulfonates having a phenyl or naphthyl group therein, such as sodium tetrahydro naphthalene sulfonate; ammonium and alkali metal salts of $C_6$ to $C_{18}$ fatty acids, such as lauric, myristic, palmitic, stearic, ricinoleic, linoleic, hydrogenated and dehydrogenated abietic acids, surface-active hydrolysis products of tallow, coconut oil, cottonseed oil, soybean oil, peanut oil, sesame oil, linseed oil, olive oil, corn oil, castor oil, lignosulfonate, and other like anionic materials.

Exemplary nonionic materials useful in the practice of the invention are alkyl aryl alkylene oxide condensates wherein the alkyl substituent varies from $C_6$ to $C_{18}$ and is attached to an aryl group, such as phenyl or naphthyl and the number of the condensed alkylene oxides, such as ethylene or propylene oxide units, varies from 1 to 100 per mol of each alkyl group, such as isooctylphenyls polyethoxy ethanol, dodecylphenyl polyethylene glycol, etc.; alkyl phenyl polyethoxylene glycol ethers, propylene oxide-ethylene oxide condensates, fatty acid alkanol amines, wherein the fatty acid constituent varies from $C_6$ to $C_{18}$, such as lauric, myristic, palmitic, stearic, ricinoleic, linoleic, hydrogenated and dehydrogenated abietic acids, surface-active hydrolysis products of tallow, coconut oil, cottonseed oil, soybean oil, peanut oil, alkoxylated derivatives of $C_6$ to $C_{18}$ fatty material, such as ethoxylated derivatives of lanolin or tallow, polyhydroxy alkyl fatty acid esters, such as glycol monooleate or sorbitan stearate, $C_6$ to $C_{18}$ fatty acid esters of lower aliphatic alcohols or polyols and higher straight-chain saturated alcohols and other like nonionic materials.

Exemplary cationic materials useful in the practice of the invention are straight-chain alkyl fatty amines having a $C_6$ to $C_{18}$ alkyl group therein, such as dicocoamine; N-alkyl trimethylene diamines, such as N-lauryl trimethylene diamine; quaternary ammonium salts, such as mono or dialkyl methyl quaternary ammonium salts having a $C_6$ to $C_{18}$ alkyl group therein, such as monococo trimethyl quaternary ammonium chloride salt, didodecyl dimethyl quaternary ammonium chloride salt, and other like cationic materials.

Exemplary amphoteric materials useful in the practice of the invention are alkali metal salts of N-cocoamino butyric acid, such as sodium or potassium cocoamino butyric acid, polyethoxy amino oxide wherein the condensed ethoxy group varies from 1 to 100 and other like amphoteric materials.

In addition, polyhydric alcohols and alkylol amines, which may also be classified in one of the aforesaid groups of surfactants, are also useful in the practice of the invention. The polyhydric alcohols are preferably $C_3$ to $C_{18}$ polyols such as glycol, glycerol, their esters, such as ethylene glycol, propylene glycol, diethylene glycol, hexane-1-2-diol, ethylene glycol monoethyl ether, ethylene glycol monomethyl ether, polyethylene glycol, glycerine, 1,2,3,4,5,6-hexanehexal, pentaerythritol, pentahydroxy pentane, $C_6$ to $C_{18}$ fatty alcohols and other like polyol materials. The alkylol amines may be alkoxylated alkanol amines or alkanol amines and preferably are alkanol amines such as $C_2$ to $C_{18}$ alkanol amines, for example, mono, di or triethanolamine, mixtures thereof, including such as occur in commercial triethanolamine, morpholine, propanolamines, including normal propanolamines and triisopropanolamines, glycerol amines, alkylol polyamines, as well as higher alkanol amines such as $C_1$ to $C_4$ alkoxylated $C_6$ to $C_{18}$ fatty amines, such as alkoxylated cocoamines and other like alkylol amine materials.

The amount of surfactant material which is required to obtain desired foaming characteristics and the synergistic coaction with the reactive solvent on the coating being removed is generally in the range of about 10 to 35 percent by weight and more preferably in the range of about 13 to 33 percent by weight.

Although one family or group of the aforesaid surfactants may be utilized as such, it is generally preferable to include a mixture of different surfactants to insure that the coating remover will be effective on the various types of coatings typically encountered. Thus, it is generally preferable to include a surfactant mixture comprised of $C_6$ to $C_{18}$ fatty acid materials, such as lauric acid, stearic acid, hydrogenated coconut oil, alkoxylated derivatives of fatty acid or tallow or lanolin, fatty acid esters of lower aliphatic alcohols or polyols and higher straight-chain saturated alcohol; $C_2$ to $C_{18}$ alkylol amines, such as methoxylated or ethoxylated coconut oil, triethanolamine and other like alkylol (including alkoxylated alkylol) amines; and $C_3$ to $C_{18}$ polyhydric alcohols, such as glycerine, hexane hexanol, fatty alcohols, etc. The amount of each of such surfactants within the mixture may vary and generally effective emulsifying and wetting action is obtained when the mixture comprises about 5 to 15 percent of $C_6$ to $C_{18}$ fatty acid materials, about 3 to 10 percent of $C_2$ to $C_{18}$ alkylol amines and about 5 to 15 percent of $C_3$ to $C_{18}$ polyhydric alcohols (all percentages being by weight basis of the overall weight of the coating remover).

The amount of water (which may be relatively pure, softened, brackish, seawater, etc.) used in the coating remover of the invention generally varies in the range of about 30 to 85 percent by weight and more preferably varies in the range of about 60 to 74 percent by weight of overall coating remover.

Because the foam-type coating remover of the invention is a water-based material, it is readily removed from a work surface by a stream of water or the like, even after reacting, dissolving or removing a coating from such a surface. Further, since the surfactants within the foam-type coating remover of the invention are relatively biodegradable, the spent remover (i.e., after reacting with a coating) may simply be discarded into the ambient environment without permanent pollution. Yet further, since the surfactants and reactive solvents within the foam-type coating remover of the invention are relatively non-toxic and relatively non-flammable, there is only a minimum or substantially no danger to human operators utilizing such coating remover and no special safety equipment or procedures are required.

As pointed out hereinabove, high or relatively high persistency and low or relatively low volatility or volatile loss are important characteristics of the foam-type coating remover of the invention. The term "persistency" refers to the ability of the foam-type coating remover to resist liquefication after application on a surface. The term "volatility" or "volatile loss" refers to the ability of the foam-type coating remover to resist evaporation or weight loss after application on a surface. These properties of the foam-type coating remover of the invention are readily determined at ambient conditions by simple and routine measurements well known to those skilled in the art. In order for the foam-type coating remover to be useful in accordance with the principles of the invention, it must exhibit a relatively high persistency and a relatively low volatile loss so that after dispensing a select amount of such foam-type remover onto a coating-covered surface, the volume thereof remaining after about 24 hours at about 77° F. is equal to at least about 50% of the original volume of the dispensed amount of the remover and the weight of the remover remaining after about 24 hours at about 77° F. is equal to at least 90% of the original weight of the dispensed amount of the remover.

For foam compositions having concentrations of N-methyl-2-pyrrolidone greater than 35% by weight, it has been found that the persistency of the foam rapidly falls to such an extent that after 24 hours at 77° F., less than one-half of the volume of the foam remains. On the other hand, where coating remover compositions having a concentration of N-methyl-2-pyrrolidone less than 5% by weight, it has been found that the persistency is only slightly reduced, however, at such low concentrations foam-type coating remover rapidly loses its effectivness so that such compositions are effectiveness recommended as effective coating removers.

The coating remover compositions of the present invention may also be provided with a greater heat absorbing capability by including within the composition a pigmented dye, preferably black, such as 2 to 10 parts by weight of any compatible dye, for example, such as commercially available under the name "All Purpose Rit Tint and Dye." The dye is preferably mixed into the formulated liquid simultaneously with the inclusion of the reactive solvent or thereafter. The inclusion of a pigmenting dye in the coating remover of the invention is of particular advantage where the remover is to be used for removing paint or other coatings from large exterior surfaces exposed to the sun since the dye will aid in the absorption of heat from the sun and will increase the activity of the reactive solvent within the coating remover.

The coating remover of the invention can easily be dispensed over large work areas, such as by using a commercially available mechanical foaming machine which agitates the liquid solution with air to form a foam and dispenses such foam through a nozzle under pressure. In addition, the coating remover may also be packaged in an aerosol can having a foam-dispensing head along with a conventional propellant, such as 7 parts by weight of Freon 12 or 114 or a combination thereof with 93 parts by weight of the coating removing composition. When this material is dispensed from such an aerosol can, the foam-type coating remover results.

With the foregoing general discussion in mind, there is now presented detailed examples which will illustrate to those skilled in the art the manner in which the invention is carried out. However, the examples are not to be construed as limiting the scope of the invention in any way.

EXAMPLE I

| Ingredients | Parts by Weight |
| --- | --- |
| Stearic acid | 6.0 to 7.6 |
| Lauric acid | 2.1 to 3.2 |
| Triethanol amine | 4.9 to 5.3 |
| 1,2,3,4,5,6-hexanehexol | 6.3 to 12.4 |
| N-methyl-2-pyrrolidone | 8.0 to 8.8 |
| Water | 6.4 to 65.1 |

The above ingredients are weighed to form a desired amount of coating remover and, except for the N-methyl-2-pyrrolidone, are added into a container and admixed with constant agitation while being heated to about 120° to 150° F. As soon as a uniform solution occurs, the N-methyl-2-pyrrolidone is added with further agitation until a homogeneous mixture is obtained. The resulting liquid composition is then cooled to room temperaure and upon emulsification of a gas therein is ready for use.

EXAMPLE II

| Ingredients | Parts by Weight |
| --- | --- |
| =Tegyel"* | 0.9 to 1.1 |
| Glyceryl monostearate | 0.8 to 1.0 |
| Stearic acid | 6.0 |
| Lauric acid | 2.1 |
| Glycerin | 10.0 to 12.4 |
| Triethanolamine | 3.9 to 4.9 |
| "M-PYROL"** | 7 to 13 |
| Water | 50 to 65 |

*A commercially available straight-chain saturated $C_{14}$-$C_{18}$ fatty acid ester of lower aliphatic alcohols, polyols and higher straight-chain saturated alcohols, for example, obtainable from Goldschmidt Chemical.
**A commercially available N-methyl-2-pyrrolidone from GAF Corporation.

A desired amount of the above ingredients is measured out and, except for the reactive solvent, is placed in a container and admixed with agitation under relatively gentle heating until a substantially uniform solution is obtained. Then, the N-methyl-2-pyrrolidone is added to this solution with a constant agitation until a uniform mixture is obtained. The composition is then cooled to room temperature and when admixed with air or some other gas, is ready for use as a foam-type coating remover.

EXAMPLE III

| Ingredients | Parts by Weight |
| --- | --- |
| Part A | |
| "Solulan 98"* | 1.1 to 1.5 |
| Methyl "Paraben"** | 0.2 to 0.3 |
| Stearic acid | 7.6 |
| "Wecoline 1260A"*** | 2.5 |
| "Aromax C-12"**** | 1.1 to 1.5 |
| Part B | |
| "Veegum"***** | 1.5 to 2.2 |
| Glycerin | 6.3 to 7.3 |
| Triethanolamine | 5.0 to 6.0 |
| Water | 60 to 70 |
| Part C | |
| N-methyl-2-pyrrolidone | 8.5 to 15 |

*An ethoxylated derivative of lanolin, available from American Cholesterol Products, Inc.
**Methyl ester of para-hydroxybenzoic acid, commercially available, for example, from Washine Chemical Corp.
***Coconut fatty acid material available from Drew Chemical Corp.
****Methoxylated or ethoxylated coconut amine oxide available from Armour Industrial Chemical Co.
*****Magnesium-aluminum silicate available from R. T. Vanderbilt Co., Inc.

Add the "Veegum" of Part B to water, agitating continuously until smooth. Add the remainder of Part B and heat to 150° F. Heat Part A to 150° F. and then add to Part B and mix. Cool to below 130° F. and then add Part C with constant agitation until a uniform liquid mixture is obtained. When ready to use, agitate air or some other gas with this liquid mixture to obtain a foam-type coating remover.

EXAMPLE IV

| Ingredients | Parts by Weight |
| --- | --- |
| Part A | |
| Stearic acid | 7.2 |
| Lauric acid | 3.2 |
| "Sorbo"* | 10.5 to 12.0 |
| Part B | |
| Water | 55 to 65 |
| Part C | |
| Triethanolamine | 5.0 to 6.0 |
| Water | 5.0 to 6.0 |
| Part D | |
| N-methyl-2-pyrrolidone | 8.0 to 15.0 |

*70% sorbitol solution, essentially 1,2,3,4,5,6-hexanehexal alcohol, available from Atlas Chemical Industries.

Heat Part A to 150° F. Add Part B and reheat to 150° F. Slowly add Part C with agitation. Mix for thirty minutes while maintaining the temperature at 150° F. Then cool slowly to a temperature below 130° F., agitating slowly while cooling. Then add Part D with constant agitation until a uniform mixture is obtained.

A number of foam-type coating remover compositions were formulated, essentially along the lines of Example II but varying the concentration of N-methyl-2-pyrrolidone from about 6.3% to 12.8%. These foams had densities (weight per unit volume) ranging from about 0.214 for the 6.3% concentration to 0.269 for the 12.8% concentration. It was determined that there was substantially no change in the volume of any of these foams after a 24 hour period, with the foams being maintained at 77° F., which is indicative of an unusually high persistency. The foam was also formulated substantially as above, except that the N-methyl-2-pyrrolidone concentration was about 35%. This foam exhibited a persistency after a 24 hour period at 77° F. which was equal to about 50% of the original volume of the dispensed amount of the foam. It was also determined that the volatile loss was very small since there was only a relatively small reduction in the weight of these foams after a 24 hour period. This loss ranged from 2.3% reduction in weight for a foam having 6.3% N-methyl-2-pyrrolidone to a 3.4% reduction in weight for a foam having 12.8% N-methyl-2-pyrrolidone therein. Accordingly, it can be seen that the foam-type coating remover of the invention has a relatively high persistency characteristic and a relatively low volatile loss so that after dispensing an amount of the foam on a coating-covered surface, the volume of the foam remaining after 24 hours at 77° F. is equal to at least 50% of the original volume of the dispensed amount of the foam and the weight of the foam remaining after 24 hours at 77° F. is equal to at least 90% of the original weight of the dispensed amount of the foam.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appendant claims.

We claim as our invention:

1. A substantially non-flammable, non-toxic, biodegradable liquid coating remover adapted when admixed with an inert gas to form a relatively stable foam, said liquid coating remover consisting essentially on a 100 total weight percent basis of:
   (A) from about 5 to 35 weight percent of N-methyl-2-pyrrolidone,
   (B) from about 30 to 85 weight percent water, and
   (C) water soluble, organic surfactant material, said surfactant material comprising on said 100 total weight percent remover basis from about 5 to 15 weight percent of $C_6$ to $C_{18}$ fatty acid materials selected from the group of acids consisting of lauric, myristic, palmitic, stearic, and mixtures thereof, from about 3 to 10 weight percent of $C_2$ to $C_4$ alkylol amines selected from the group consisting of mono-, di-, and tri-alkylol amines, and mixtures thereof, and from about 5 to 15 weight percent of $C_3$ to $C_{18}$ polyhydric alcohols selected from the group consisting of glycerol, glycol, pentaerythritol, 1,2,3,4,5,6-hexanehexol, and mixtures thereof.

2. A liquid coating remover as defined in claim 1 wherein the concentration of N-methyl-2-pyrrolidone is about 6 to 15% by weight.

3. A liquid coating remover as defined in claim 1 including a pigmented material dispersed therein for increasing the heat absorbing capability of said remover when admixed with a gas to form a foam.

4. A method of removing a polyamide epoxy base coating from a large surface comprising dispensing over said surface a foam produced from the liquid coating remover defined in claim 1, allowing said foam to remain in contact with said surface for a period of time sufficient for at least the reactive solvent within said foam to interact with said coating and removing the resultant reaction product comprised of spent foam and removed coating by a stream of water.

* * * * *